United States Patent [19]
Marsh et al.

[11] Patent Number: 5,811,688
[45] Date of Patent: *Sep. 22, 1998

[54] OPEN CHANNEL FLOWMETER UTILIZING SURFACE VELOCITY AND LOOKDOWN LEVEL DEVICES

[75] Inventors: Lawrence B. Marsh, Buckeystown, Md.; Donald B. Heckman, Purcellville, Va.

[73] Assignee: Marsh-McBirney, Inc., Frederick, Md.

[ * ] Notice: The term of this patent shall not extend beyond the expiration date of Pat. No. 5,684,250.

[21] Appl. No.: 787,094

[22] Filed: Jan. 22, 1997

Related U.S. Application Data

[63] Continuation-in-part of Ser. No. 588,326, Jan. 18, 1996, abandoned.

[51] Int. Cl.⁶ ........................................................ G01F 1/66
[52] U.S. Cl. ............................................. 73/861.25; 73/277
[58] Field of Search ........................... 73/861.27, 861.28, 73/861.29, 861.31, 861.25

[56] References Cited

U.S. PATENT DOCUMENTS

| | | | |
|---|---|---|---|
| 3,910,116 | 10/1975 | Smith | 73/290 |
| 4,034,607 | 7/1977 | Matrig, Jr. | 73/215 |
| 4,125,020 | 11/1978 | McClure | 73/215 |
| 4,145,914 | 3/1979 | Newman | 73/290 |
| 4,397,191 | 8/1983 | Forden | 73/861.18 |
| 5,198,989 | 3/1993 | Petroff | 364/510 |
| 5,315,880 | 5/1994 | Bailey | 73/861.25 |

*Primary Examiner*—Christine K. Oda
*Assistant Examiner*—Ronald Biegel
*Attorney, Agent, or Firm*—Laubscher & Laubscher

[57] ABSTRACT

A flowmeter utilizing velocity at the surface of a fluid and lookdown level sensors is mounted within a manhole without requiring entry into the manhole by the installer. The velocity and level sensors generate first and second energy signal beams which are directed toward the same vicinity of the fluid surface which reflects the beams back to the sensors surface velocity signal representative of the velocity of scatters on the fluid surface is produced from the Doppler frequency shift between the directed and reflected first beam. This signal is modified to produce a mean velocity signal. A level signal is produced by determining the air space between the sensor and the fluid surface from the directed and reflected second beam and relating changes in the air space to changes in fluid level in accordance with the configuration of the pipe. Fluid flow can be calculated from the mean velocity and fluid level signals.

47 Claims, 12 Drawing Sheets

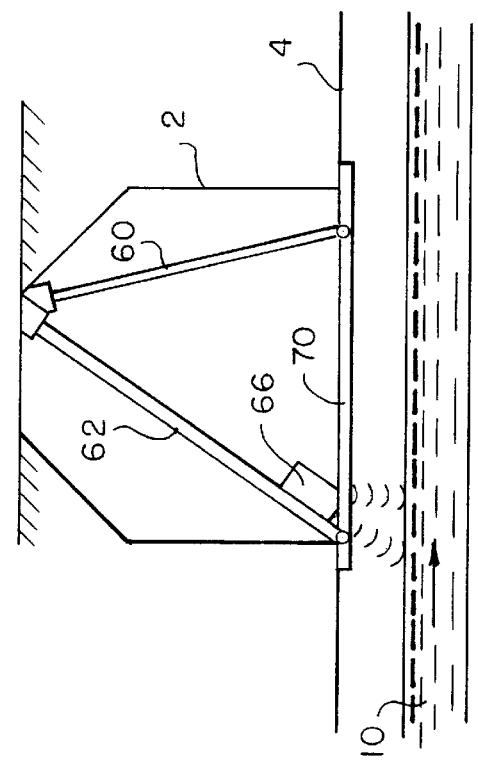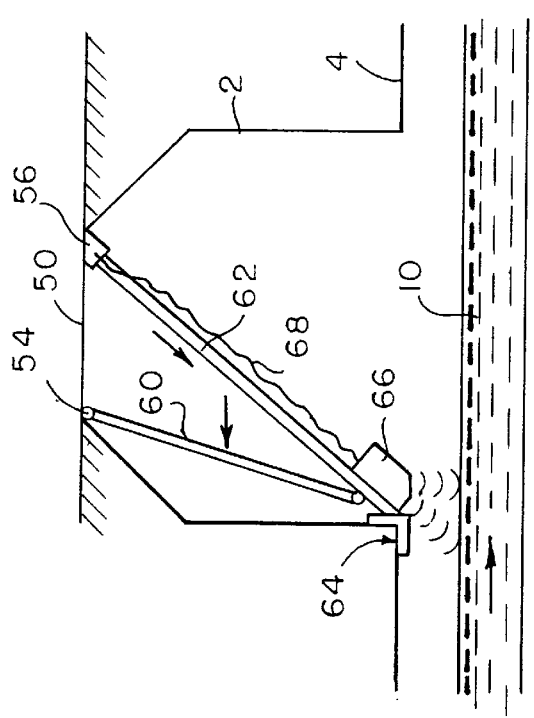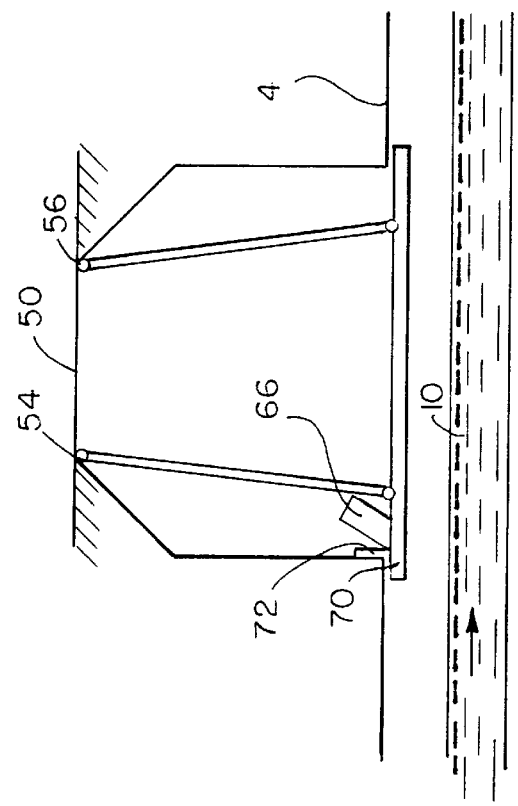
FIG. 9
FIG. 10
FIG. 11

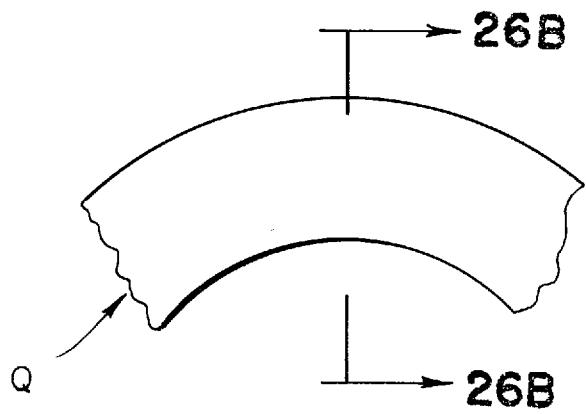
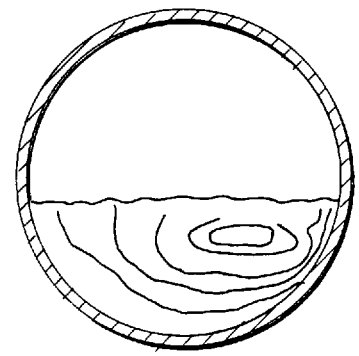
FIG. 26A  FIG. 26B
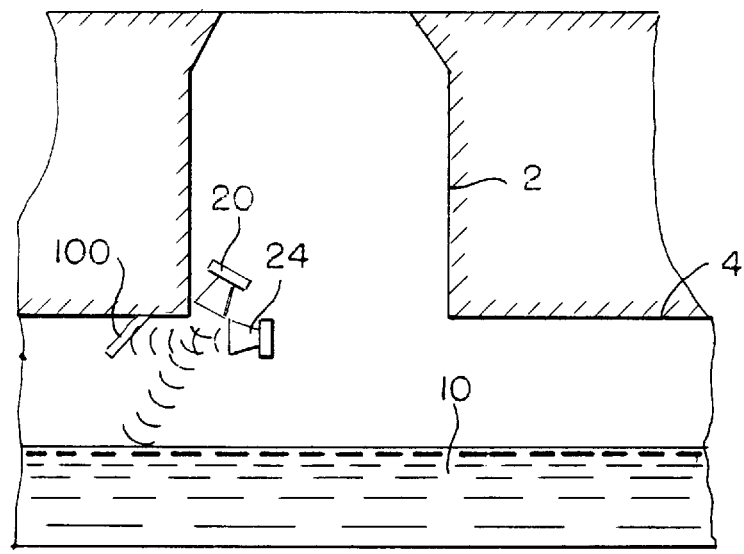
FIG. 27

OPEN CHANNEL FLOWMETER UTILIZING SURFACE VELOCITY AND LOOKDOWN LEVEL DEVICES

This application is a continuation-in-part of application Ser. No. 08/588,326 filed Jan. 18, 1996, now abandoned.

BACKGROUND OF THE INVENTION

The measurement of open channel flow in municipal water and wastewater piping systems is becoming increasingly important since processing of wastewater is an important but expensive process. Accurate flow metering is necessary for billing, engineering studies, determination of inflow and infiltration, and for the control of the actual flow itself so as to minimize the impact of peak flows on the wastewater treatment facility.

There are a number of open channel flowmeters in existence today. One type of flowmeter uses the measurement of level plus the use of a primary device such as a flume or weir so as to characterize the level to flow relationship in a known cross section. Another type utilizes velocity/area techniques eliminating the need for having a primary device and allowing for the velocity and level devices to be installed in existing piping systems without modification. Both of the above mentioned flowmetering devices typically require the user to enter confined spaces such as a manhole so as to install either a primary device, or alternately, require a mounting band that contains a velocity and level transducer. Quite often this can be dangerous both because of the flowing water and because of combustible or toxic gases that may exist in the piping system. To this end, the regulatory agencies in most countries have adopted regulations as to the requirements for entry into such a confined space. Most require portable gas detectors, ventilation systems, and tripods with hoists and a harness so as to allow the worker in the manhole to be quickly raised up by two additional other people in case of endangerment. Thus, entering a manhole is a dangerous, time consuming, and very expensive process.

Accordingly, there is a need for a flowmeter for measuring both the fluid velocity and the fluid level by non-invasive level and velocity sensors that can be mounted inside a manhole above the flowing stream (and typically just above the top of the pipe). The velocity and level signals can be combined with knowledge of the pipe diameter and by using a surface velocity modifier, the instrument electronics converts the sensed surface velocity to approximate the average velocity of the stream.

BRIEF DESCRIPTION OF THE PRIOR ART

An invasive flowmeter of the type known in the art is disclosed in the Marsh U.S. Pat. No. 4,083,246. An electromagnetic sensor is positioned at the bottom of a pipe by a mounting band. The submerged sensor senses a local velocity of the fluid at a particular point or location within the fluid. The local velocity signal is modified to produce an average velocity signal. A pressure transducer is utilized to determine the fluid depth and thus, the cross-sectional area of the fluid within pipe of a known configuration and dimension. The average velocity and area signals are multiplied to produce a flow signal. The major drawback of this prior type of flowmeter is the need for a technician to enter a manhole and physically mount the sensor at the bottom of the pipe in which flow is to be measured. Another drawback is that the sensor and mounting band can collect debris from the fluid, thereby reducing the accuracy of the sensed velocity signal.

Non-invasive methods for measuring flow are also known in the patented prior art, as evidenced by the U.S. patent to Bailey No. 5,315,880. As disclosed therein, a microwave frequency signal is directed toward the surface of a fluid flowing in an open channel. More particularly, the signal is directed along a line toward the fluid surface opposite to the direction of fluid flow. At least a portion of the signal is reflected from the fluid surface, and the Doppler frequency shift between the directed and reflected signals is used as a measure of the velocity of the fluid surface. A non-invasive measure of the fluid depth is obtained using ultrasonic measurement techniques. From the measurements of velocity and depth, the flow rate of the fluid is calculated.

While the non-invasive flow measuring technique of Bailey is an improvement over earlier flow measurement methodologies, there are certain drawbacks. For example, depending on the surrounding environment, it is not always possible to measure flow by directing a microwave signal in an upstream direction. This is particularly so in smaller manholes and other situations where access to a pipe or conduit is restricted. Another drawback is that the measurement of surface velocity does not necessarily represent the mean velocity of the fluid whose flow is being measured. Furthermore, unless there are disturbances or scatterers in the fluid surface, an accurate measurement of surface velocity is difficult to obtain. This problem is compounded in full pipe or surcharge flow conditions. It is also difficult for a technician to securely mount a flow sensor above the fluid in a pipe or conduit without physically entering the manhole connected with the pipe.

The present invention was developed in order to overcome these and other drawbacks by providing a non-invasive flowmeter and a mounting assembly therefor which will provide more accurate flow measurements using a variety of fluid velocity and level measuring techniques.

SUMMARY OF THE INVENTION

Accordingly, it is a primary object of the present invention to provide an improved non-invasive method and apparatus for measuring the flow of fluid in a pipe. A sensor is mounted above the fluid and directs a first beam of microwave, acoustic, or laser energy toward a given area of the fluid surface at an acute angle. The sensor detects the beam reflected from the fluid surface and determines the Doppler frequency shift between the directed and reflected beams to produce a first signal representative of the velocity of scatterers on the fluid surface. A microprocessor is connected with the sensor and modifies the surface signal in accordance with the portion of the surface whose velocity is being detected to produce a mean velocity signal. The same or a different sensor also mounted above the fluid directs a second beam of microwave, acoustic, or laser energy toward the given area of the fluid surface. Changes in the air space distance between the sensor and the fluid surface are determined from reflections of the second energy beam from the surface. These changes are related to changes in fluid level in accordance with a reference corresponding with the configuration of the pipe. The mean velocity and fluid level signals are combined to calculate the fluid flow for the pipe.

According to another object of the invention, the microprocessor processes the reflected second energy beam to eliminate portions thereof reflected from non-moving surfaces. The microprocessor further eliminates variations from ripples and waves within the fluid and adjusts the modification of the surface signal in accordance with the roughness of the fluid surface.

It is yet another object of the invention to provide an assembly for mounting the sensor at the crown of the pipe, preferably at either the entrance or exit of the pipe with respect to a manhole. According to one embodiment, a mounting bracket or jack is connected with a portion of the manhole adjacent the access opening. Extending from the mounting bracket are one or more cables, rods, or compression struts, at the bottom of which is an angle bracket adapted to be wedged by tensioning the cables, rods, or struts against the sidewall of the manhole and the crown of the pipe. The sensor is connected with the angle bracket in either a fixed or a self-leveling relation.

Another object of the invention is to create disturbances on the fluid surface to provide more accurate measurements of surface velocity and fluid level. In one embodiment, a fluted shroud is provided as an extension of the pipe within the manhole to create disturbances or scatterers in the fluid surface. In another embodiment, a second fluid transparent to microwaves is superimposed between the fluid whose velocity is being measured and an inner surface of the pipe.

While the invention is designed primarily for use in an open section of pipe or channel within a manhole, it could also be used to measure fluid flow in a closed pipe where the pipe is formed of a material transparent to the energy beams transmitted from the sensor.

BRIEF DESCRIPTION OF THE FIGURES

Other objects and advantages of the invention will become apparent from a study of the following specification when viewed in the light of the accompanying drawing, in which:

FIGS. 9–12 are sectional views of various alternative flowmeter mounting assemblies, respectively;

FIG. 26A is a curved section of a circular conduit and FIG. 26B is an illustration of the velocity contour of a fluid flowing in the partly filled conduit of FIG. 26A; and FIG. 27 is a schematic sectional view of a flowmeter sensor assembly including a reflector.

DETAILED DESCRIPTION

Figure 1:
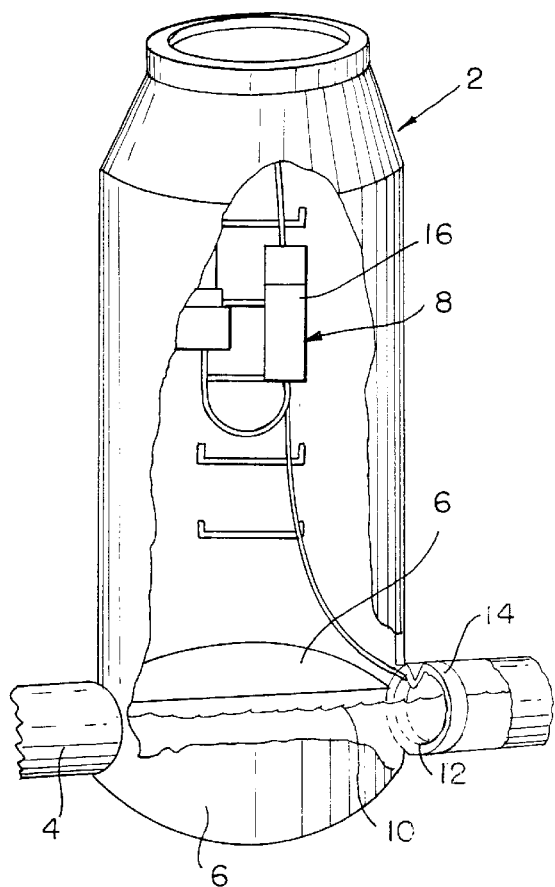
FIG. 1 is a partial cutaway view of a manhole having an invasive flow meter according to the prior art mounted therein for measuring the flow of fluid in a pipe.

In FIG. 1, there is shown a manhole 2 which affords access to a pipe 4 which passes through the bottom of the manhole adjacent the bench 6 thereof and which has an invasive flowmeter 8 mounted therein for measuring the flow of fluid 10 through the pipe. The fluid may comprise water, oil, sewage, or any other flowing liquid. The flowmeter includes a sensor such as an electromagnetic or acoustic sensor 12 connected with a mounting band 14 which submerges the sensor in the fluid. A level measuring device may be included within the sensor. The sensor is connected with a processing and recording device 16 mounted within the manhole.

It will be appreciated that in order to mount the flowmeter sensor 12 in the manhole, a technician must physically enter the manhole and properly position the sensor and mounting band so that the proper fluid velocity and level signals can be obtained. This is relatively dangerous and must be performed in compliance with safety regulations which increase the time and expense of mounting and evaluating the position of the flowmeter.

Figure 2:
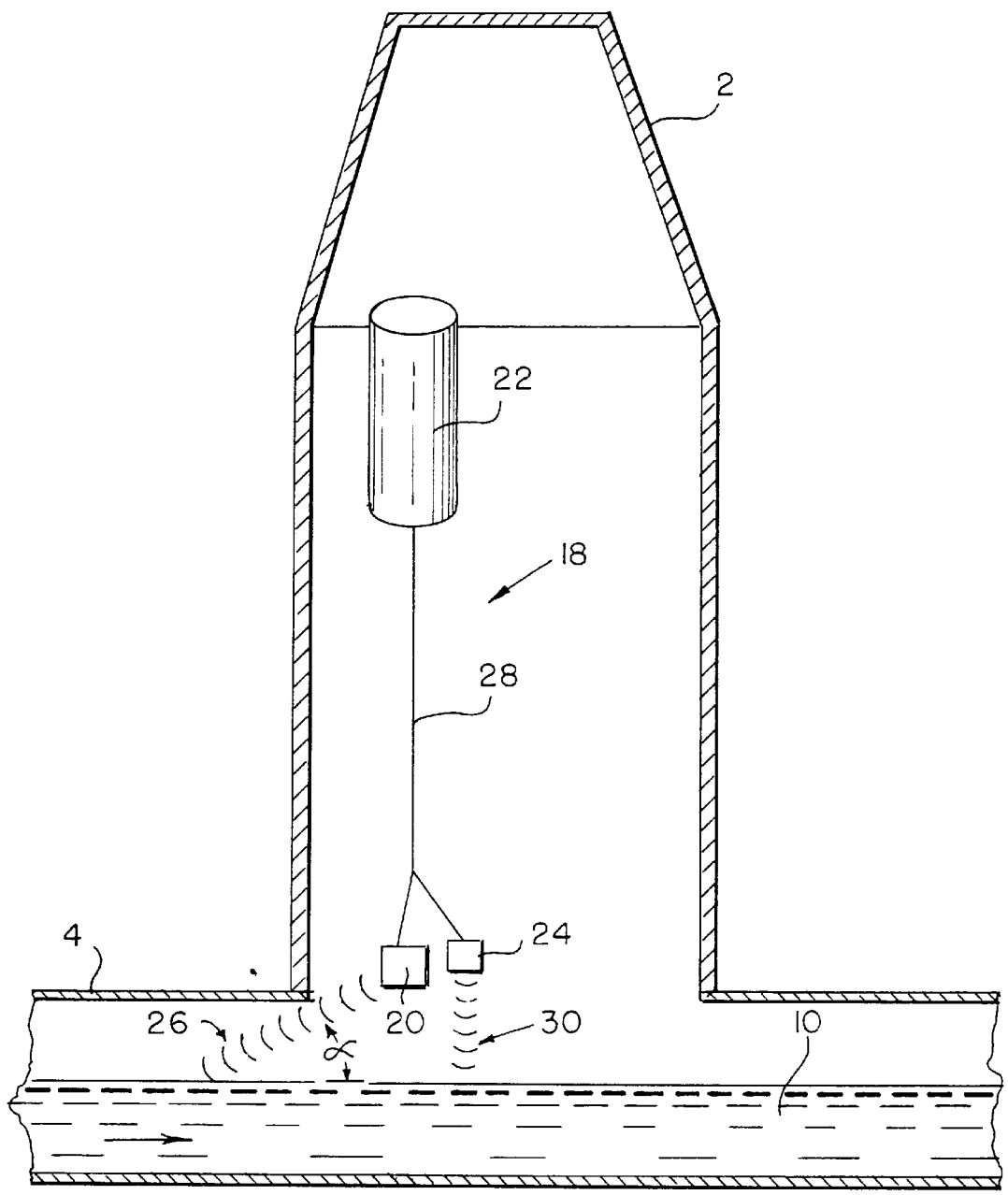
FIG. 2 is a sectional view of a manhole having a non-invasive flowmeter according to the invention arranged therein.

Referring now to FIG. 2, there is shown a non-invasive flowmeter 18 according to the invention suspended within a manhole above the surface of the fluid 10 whose flow is being measured. As will be developed in greater detail below, the flowmeter includes at least one velocity sensor 20 for generating a surface velocity signal representing the velocity of scatterers on the surface of the fluid and a microprocessor 22 connected with the sensor for modifying the surface velocity signal to approximate the mean velocity of the fluid. A second sensor 24 is provided to generate a signal corresponding to fluid depth. The velocity and depth signals can be combined by the microprocessor to produce an output corresponding with the flow rate of the fluid.

The sensor 20 generates a first energy beam 26 which is directed toward a given area of the surface of the fluid 10 at an acute angle $\alpha$ of between 30° and 50° relative to the fluid surface. The first beam can be directed at any portion of the fluid surface between the sides of the pipe, so long as the beam continues to strike the fluid surface as the height of the fluid changes. As shown in the velocity contours of FIGS. 25A, 25B, and 26B, the surface velocity of the fluid varies from side to side across the fluid surface. A portion of the first beam is reflected back to the sensor from scatterers on the fluid surface. The sensor determines the Doppler frequency shift between the original and reflected first energy beam to produce a local surface signal $SV_1$ representative of the velocity of the scatterers on the surface. This signal is delivered to the microprocessor 22 via a cable 28 where the surface velocity signal is first corrected for the angle of incidence $\alpha$ by the format $S_{V1}/\cos\alpha = S_v$. The corrected local velocity signal $S_V$ is subsequently modified to produce a mean velocity signal as will be developed in greater detail below.

Any suitable energy source may be incorporated into the sensor 20 to generate the first beam 26, so long as the energy is reflectable from scatterers on the fluid surface or from the air/fluid interface at the fluid surface. Examples of such energy sources are microwave, acoustic, and laser energy sources. As opposed to the non-invasive flowmeters of the type disclosed in the Bailey patent No. 5,315,880, the inventive flowmeter may have a velocity sensor which directs the first energy beam in either an upstream or downstream direction. This capability allows the sensor to be used in confined areas without diminishing the reliability of the surface velocity measurement.

The second sensor 24 generates a second energy beam 30 which is directed toward the fluid surface in the vicinity of the given area of the surface toward which the first energy beam is directed. The second energy beam also is either microwave, acoustic, or laser energy so that at least a portion of the beam is reflected from the fluid surface. The reflected portion of the second beam is detected by the second sensor 24 and from the directed and reflected beams, the sensor determines the air space distance between the sensor and the fluid surface. Changes in the air space distance can be related to changes in the fluid level in accordance with a reference signal corresponding with the configuration of the pipe 4.

The second energy beam 30 is preferably directed toward the fluid surface perpendicular thereto as shown in FIG. 2. This provides the maximum signal return and yields the most accurate measurements of fluid depth under a wide range of environments. However, it is also possible to direct the second beam in a direction coincident with the first beam. This is particularly useful where a single sensor is used to generate both of the first and second beams. That is, a single sensor can be used to send first and second directed beams and to receive first and second reflected beams to determine both surface velocity and fluid level. If mounting considerations preclude the positioning of the level sensor above the preferred location for velocity measurement, then a reflector 100 can be utilized to re-direct the second beam to the preferred location as shown in FIG. 27. In either case, it is important that the surface velocity and fluid level measurements be taken in the same vicinity of the fluid surface so that the most accurate flow calculations can be made according to the continuity equation:

$$Q = \bar{V} \times A$$

where Q=fluid flow
$\bar{V}$=mean velocity of the fluid
A=area of the fluid.

Figure 3:
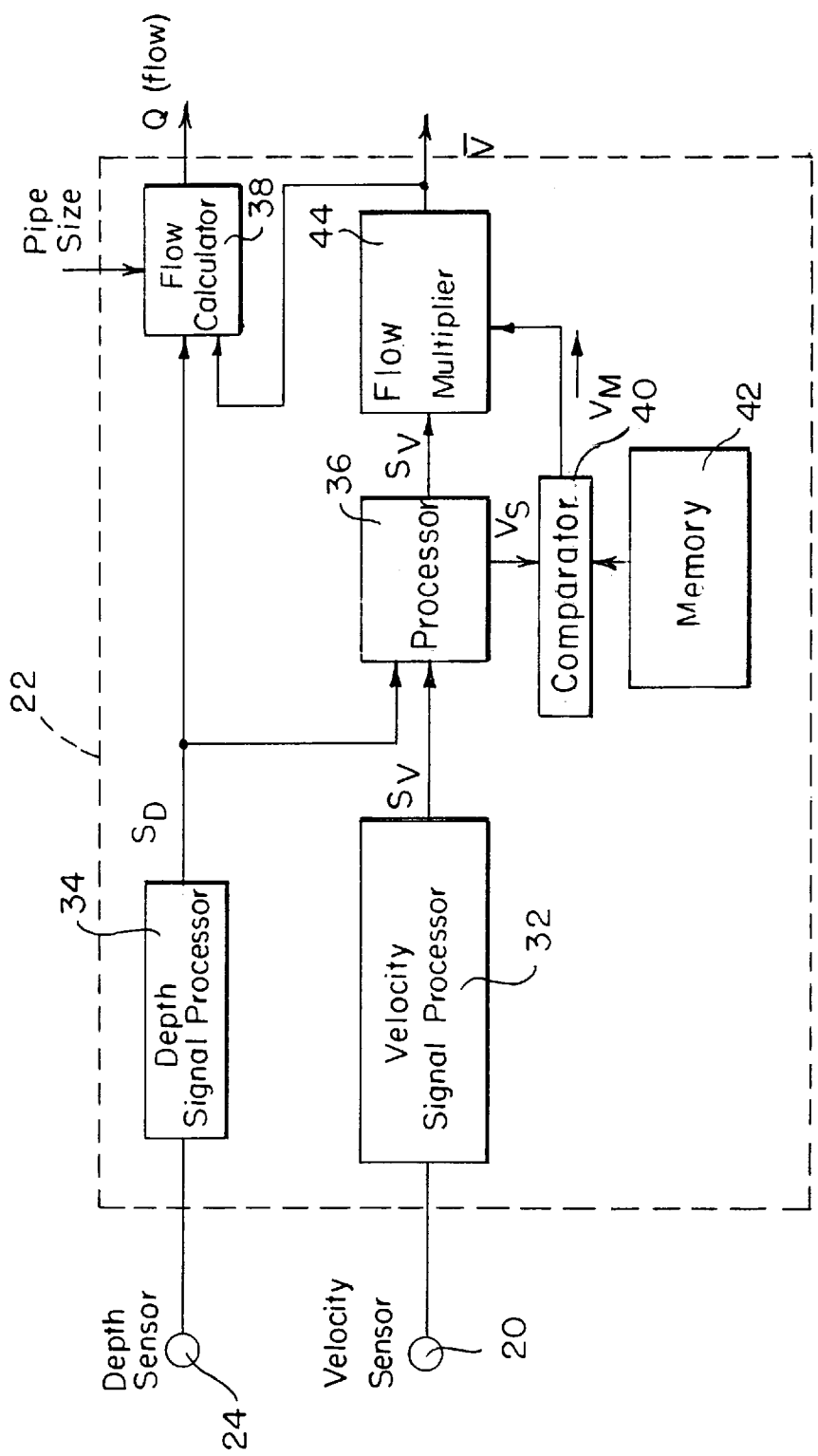
FIG. 3 is a block diagram illustrating the components used according to the invention to calculate flow using the flowmeter of FIG. 2.
Figure 25A:
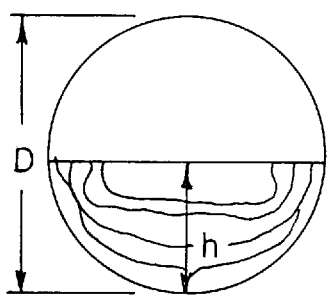
FIGS. 25A and 25B are illustrations of the velocity contours of a fluid flowing in a partly filled circular conduit at different fluid heights, respectively.
Figure 25B:
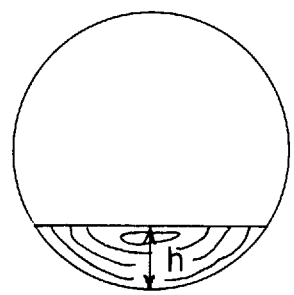

Flow calculations are performed by the microprocessor 22 which is illustrated in greater detail in FIG. 3. The microprocessor, includes a velocity signal processor 32 which modifies the local surface velocity signal in accordance with at least one of the location of the sensed area relative to the sides of the channel or pipe, the fluid depth, the diameter of the pipe, the configuration of the pipe and the ratio of velocity at the surface to fluid level, thereby to take into account the different surface velocities appearing from side to side across the surface of the fluid as shown in FIGS. 25A, 25B, and 26B that result from changes in level, pipe configuration, and entrance and outlet conditions. The microprocessor 22 also includes a depth signal processor 34 which processes the reflected second energy beam to eliminate portions of the reflected beam from non-moving surfaces, such as the sides or bottom of the pipe, in order to increase the accuracy of the fluid level measurement. The depth signal processor 34 also eliminates variations in level measurement resulting from ripples and waves in the fluid. Variations in velocity measurements at the surfface resulting from ripples and waves are also eliminated by analyzing the portion of the variations in level measurement resulting from ripples and waves to determine the frequencies present and eliminating these frequencies from the velocity Doppler signals from the surface. The processed depth signal $S_D$ and the local surface velocity signal $S_V$ are delivered to a processor 36 and the depth signal is also transmitted to a flow calculator 38 which also receives as an input an indication of the pipe size and configuration. The processor 36 passes through the local surface velocity signal $S_V$ and also produces a site signal $V_s$ which is uniquely defined by the fluid depth, the diameter of the pipe, the configuration of the pipe, and the ratio of velocity at the surface to fluid level at the location where the first beam 20 strikes the fluid surface. The site local surface velocity signal $S_V$ compared at a comparator 40 with stored mathematical relationships from a memory 42 c3 c4 coefficients are provided in the multiplier 44 in accordance with the different surface velocities occurring across the fluid surface for different fluid depths, pipe sizes and configurations, multiple velocity sensors, and the like. While the mean velocity $\bar{V}$ can be the final result, it is normally combined with the level signal along with the pipe information at the flow calculator which produces a flow signal Q using known mathematical relationships. These relationships correspond with various pipe and channel configurations. Thus, the flowmeter of the invention can be used to monitor fluid flow in round, square, rectangular conduits, or irregularly shaped channels. The microprocessor can also be used to process the level signal in accordance with Manning's Equation.

As set forth above, the velocity at the surface is not a direct measure of the mean velocity of the fluid flowing through a pipe. However, the representative signal of velocity can be modified in order to approximate the mean velocity. There are several types of modification, some of which are more accurate than others. Multiplying the sensed velocity at the surface by a constant factor provides a first order estimate of the mean velocity and can be used in certain circumstances. However, the most accurate modifying technique for a given piping configuration is one in which the multiplier is a function of both the level and the velocity at the surface. This variable modifier provides accuracies of ±5% or better.

If a direct flow output is required by the flowmeter device, the modifying technique needs to be installed directly into the flowmeter. If, however, the velocity and level are being recorded for subsequent use, the modifier can be stored in equations in a different device. Such a device could easily comprise a separate computer which would take the sensed level and velocity data from the site and, with knowledge of the pipe diameter, calculate an mean velocity and then the flow rate for that site.

Figure 4:
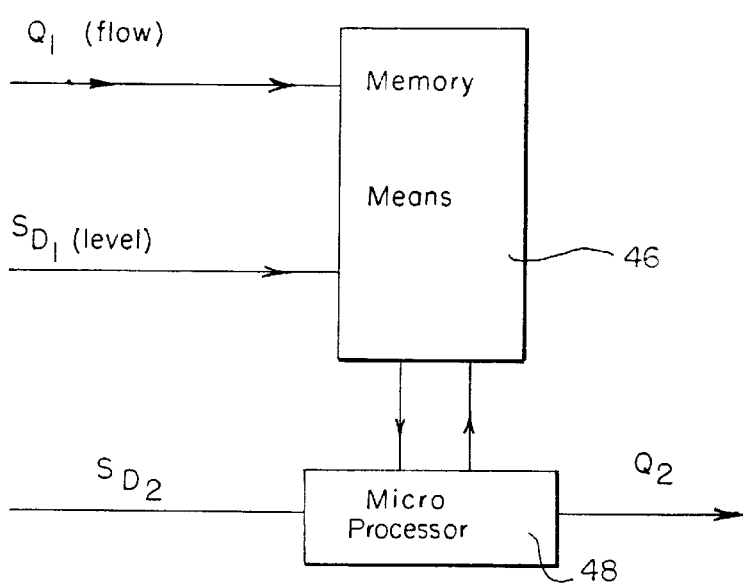
FIG. 4 is a block diagram of an alternate embodiment of the flow calculating components.

As described above, a flowmeter that measures both level and velocity can be made to adapt to the changing relationships between level, velocity and flow. However, quite often there are stable conditions in an open channel flow condition where if the level to flow relationship is known, then a flowmeter that measures only level can be utilized. Referring to FIG. 4, the flow output Q for each corresponding level can be stored in a memory 46, whereby the level to flow relationship is defined for a particular site. When such a level to flow relationship has been defined through the velocity/level flowmeter, then a simpler flowmeter utilizing only a level device can be utilized. For each level measurement, a microprocessor 48 extracts from the memory (or a lookup table) a flow rate for the corresponding level. The level device used in the simpler flowmeter does not have to be the same type of level device as used in the level/velocity flowmeter described above with reference to FIG. 2. If, for instance, the level device in the level/velocity meter is an acoustic lookdown level detector, then the level device in the level only flowmeter could just as well be a bubbler or a pressure transducer level meter.

An important aspect of the present invention is the mounting assembly for securely mounting the flowmeter within a manhole without requiring the installer to physically enter the manhole. A number of mounting assemblies will be described with reference to FIGS. 5–15.

Figure 5:
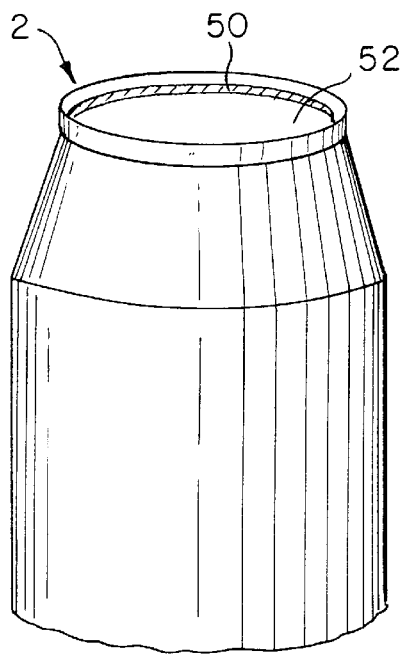
FIGS. 5 and 6 are perspective and top views, respectively, of a flowmeter mounting bracket at the access opening of a manhole.
Figure 7:
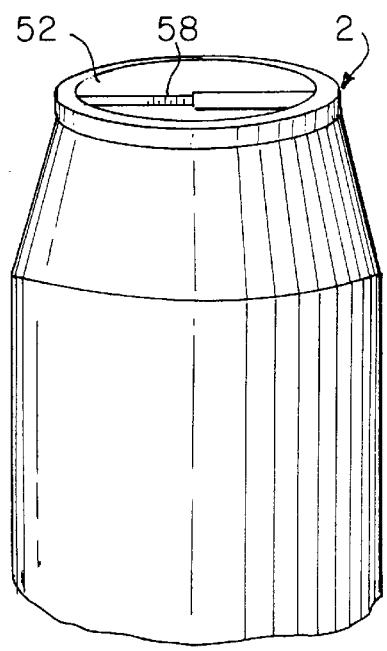
FIGS. 7 and 8 are perspective and top views, respectively, of an alternate flowmeter mounting jack at the access opening of a manhole.
Figure 6:
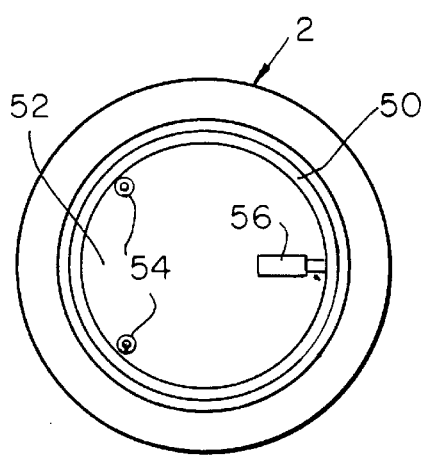
Figure 8:
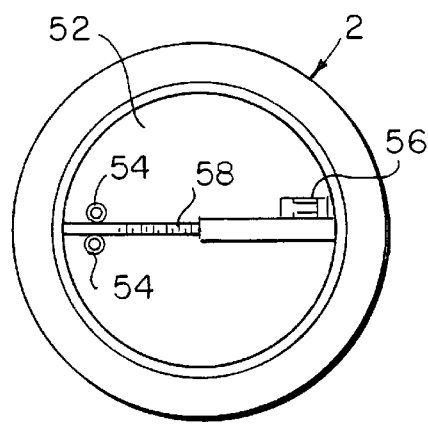

In FIGS. 5 and 6 there is shown a mounting ring or bracket 50 which is arranged and fixed within a manhole 2 adjacent to the access opening 52 thereof. Connected with the inner surface of the bracket are a pair of cable ties 54 and a pole fastener 56 with which are connected mounting cables and a telescoping pole, respectively, as will be developed below. In FIGS. 7 and 8, a jack screw 58 extends across the access opening 52 of the manhole 2 in place of the mounting bracket. The jack screw has a pair of cable ties 54 and a pole fastener 56 connected therewith.

Referring now to FIG. 9, there is shown in cross-section a manhole 2 and the flowmeter mounting assembly according to a first embodiment of the invention. The mounting ring 50 of FIGS. 5 and 6 (or the jack screw of FIGS. 7 and 8) is arranged at the access opening 52 and a pair of cables 60 depend from the cable ties 54. Similarly, a telescoping pole 62 depends from the pole fastener 56. At the remote end of the pole 62 is connected an angle bracket 64 with which is connected a sensor 66 of the flowmeter. In this embodiment, the sensor is a single device which emits both the first and second energy beams for measuring the velocity at the surface and the level of the fluid 10 flowing through the pipe 4. The lower ends of the cables 60 are connected with the pole 62 adjacent to the angle bracket 64. By extending the pole 62 downwardly into the manhole and by pulling upwardly on the cables 60, the angle bracket 64 is wedged against the crown of the pipe adjacent to the sidewall of the manhole. Signals from the sensor are delivered to a microprocessor (not shown) via a cable 68. A characterizing feature of the mounting assembly of FIG. 9 is that the sensor can be accurately positioned above the fluid and retained in place at a location indexed to the crown of the pipe without requiring the installer to enter the manhole. All installation, monitoring, and repair of the flowmeter can be handled externally of the manhole.

In the second embodiment of the mounting assembly shown in FIG. 10, the angle bracket is replaced by a horizontally arranged pole 70 which is connected with the lower ends of the telescoping pole 62 and the cables 60. The horizontal pole has a length which is greater than the diameter of the manhole so that an upward force applied to the telescoping pole 62 and to the cables 60 will wedge the pole against the crown of the pipe adjacent to the opposed sidewall portions of the manhole. The sensor 66 is connected with the telescoping pole 62 and the horizontal pole 70 at the juncture thereof so that the sensor can be positioned at the crown of the pipe.

In the embodiment of FIG. 10, the telescoping pole and cables depend from the same location on the mounting ring or screw. In the alternate embodiment of FIG. 11, the pole and cables depend from separate cable ties and the pole fastener as in the embodiment of FIG. 9. In FIG. 11, the horizontal pole 70 includes a stop 72 which assists in positioning the horizontal pole and the sensor at the desired location at the crown of the pipe. While the mounting assemblies of FIGS. 10 and 11 have been described as comprising a combination of telescoping poles and cables, it will be appreciated that an assembly comprising only poles or cables will operate satisfactorily.

Figure 12:
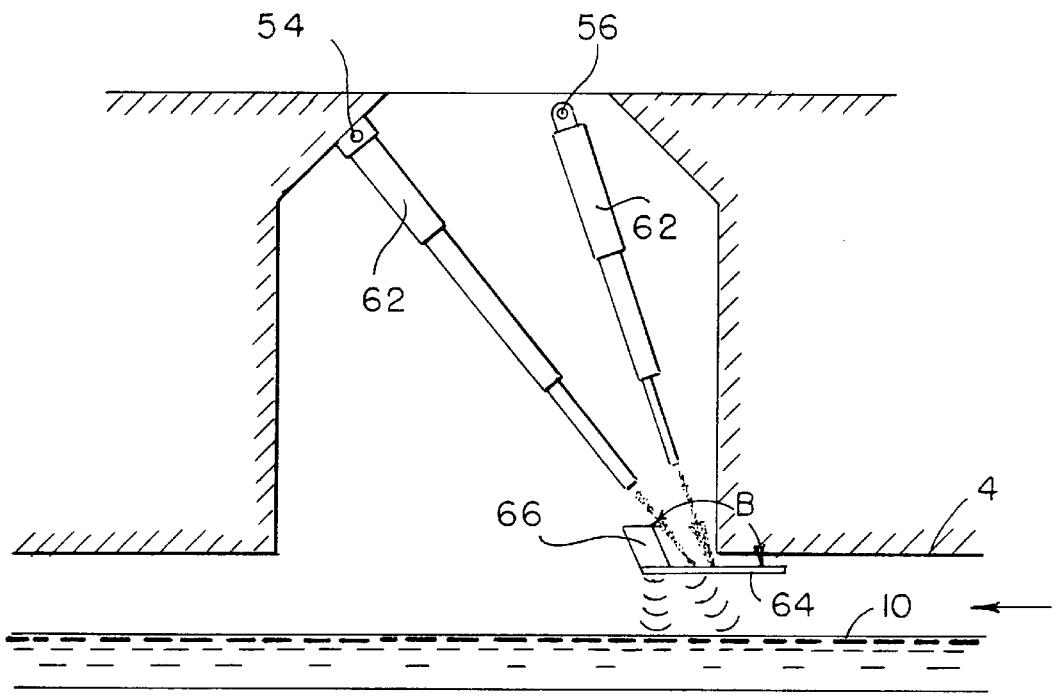
Figure 13:
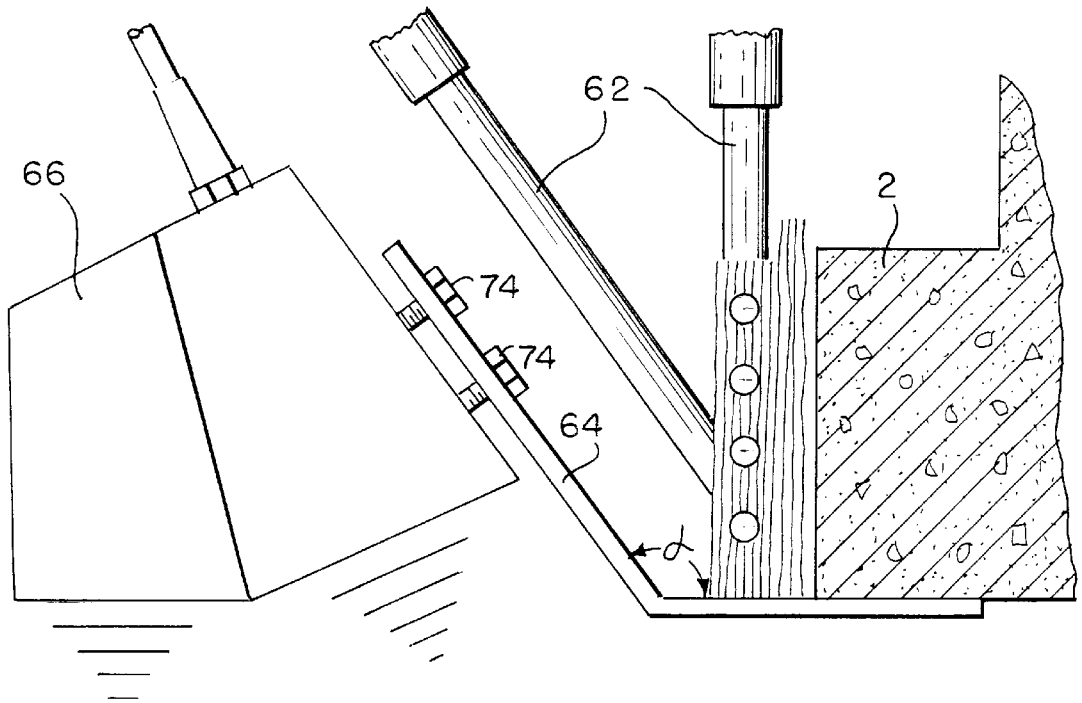
FIGS. 13 and 14 are detailed sectional views of alternate embodiments, respectively, for connecting a sensor with an angle bracket of the mounting assembly.
Figure 14:
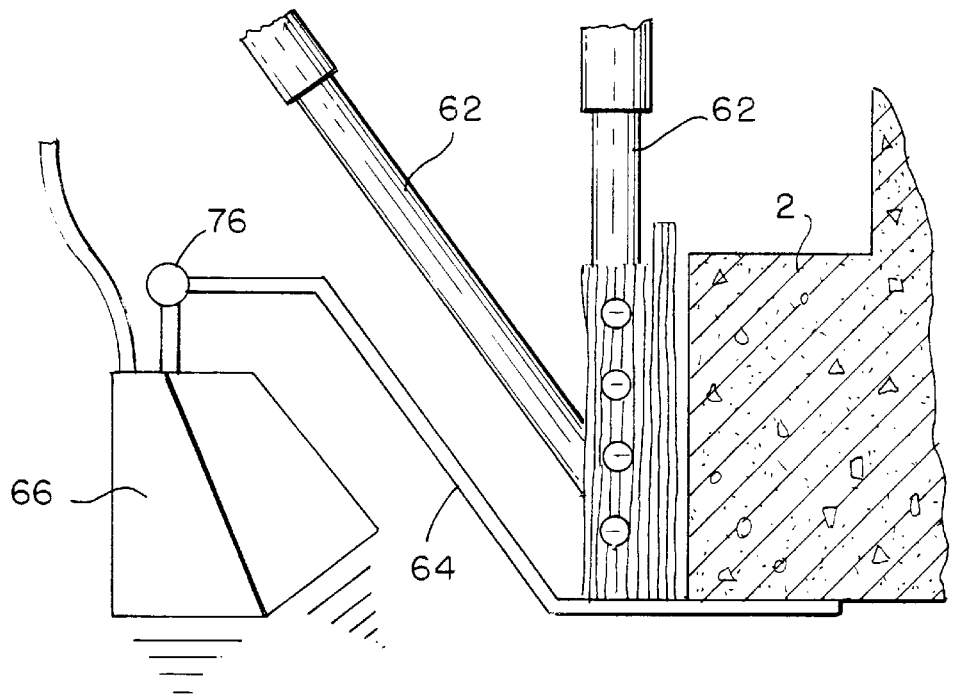
Figure 15:
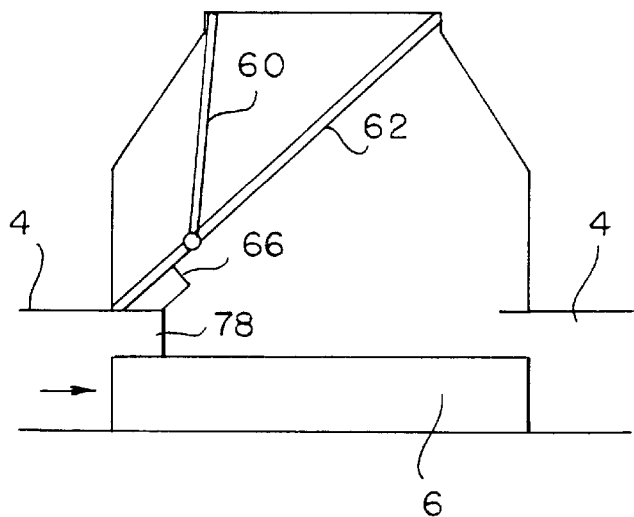
FIGS. 15 and 16 are sectional and perspective views, respectively, of the inventive flowmeter including a shroud for creating disturbances or scatterers in the fluid surface.

Turning now to the embodiment of FIG. 12, there is shown a mounting assembly comprising a pair of telescoping poles 62 which are used to wedge an angle bracket 64 against a manhole sidewall adjacent to the crown of the pipe. In FIG. 13, the connection of the sensor 66 with the angle bracket 64 is shown. The angle bracket has a fixed obtuse angle a which is the complement of the acute angle at which the first energy beam 26 from the sensor 66 is directed toward the fluid surface. Suitable fasteners such as bolts 74 rigidly connect the sensor with the angle bracket. In lieu of the rigid sensor connection shown in FIG. 13, a self-leveling mounting structure such a ball joint 76 can be used for the sensor as shown in FIG. 14.

Figure 16:
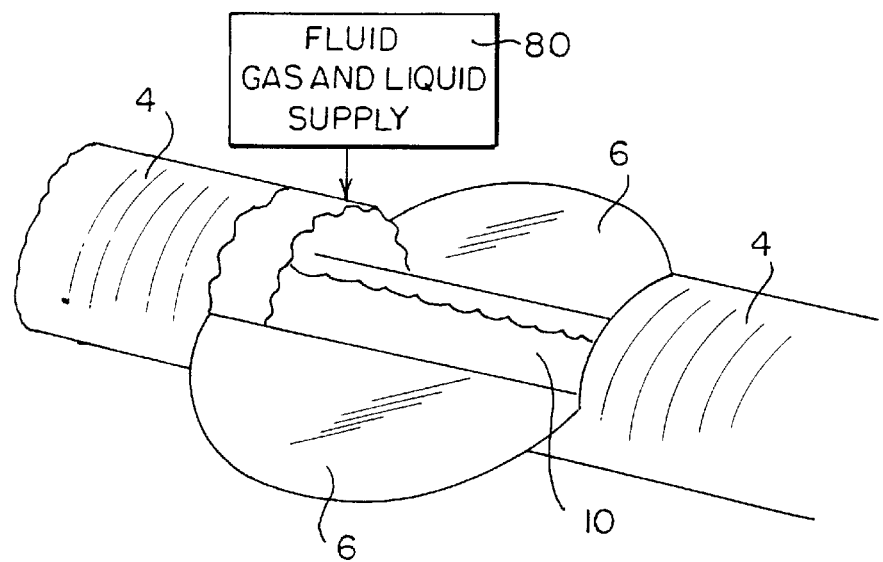

For measuring flow depths up to a full pipe, a shroud 78 can be provided as shown in FIGS. 15–18 which effectively extends the pipe 4 into the manhole. The shroud is transparent to the energy beam from the sensor 66, whereby the sensor is adapted for mounting adjacent to the shroud at the crown thereof. In the embodiment of FIG. 16, a gas and/or liquid fluid supply 80 is provided which directs a buffer layer of fluid which is transparent to the energy beams between the surface of the fluid being measured and the top of the pipe or shroud. Otherwise, if the fluid to be measured was in physical contact with the inside of the pipe of shroud, those layers of fluid nearest the wall would be virtually stationary and would affect the accuracy of the velocity measurement.

Figure 17:
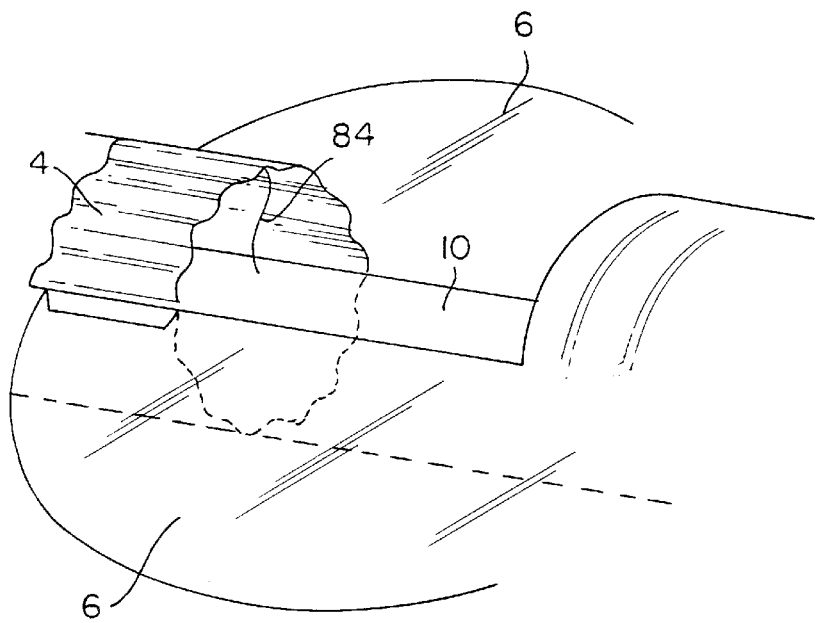
FIGS. 17 and 18 are perspective views, respectively, of differently configured shrouds.
Figure 18:
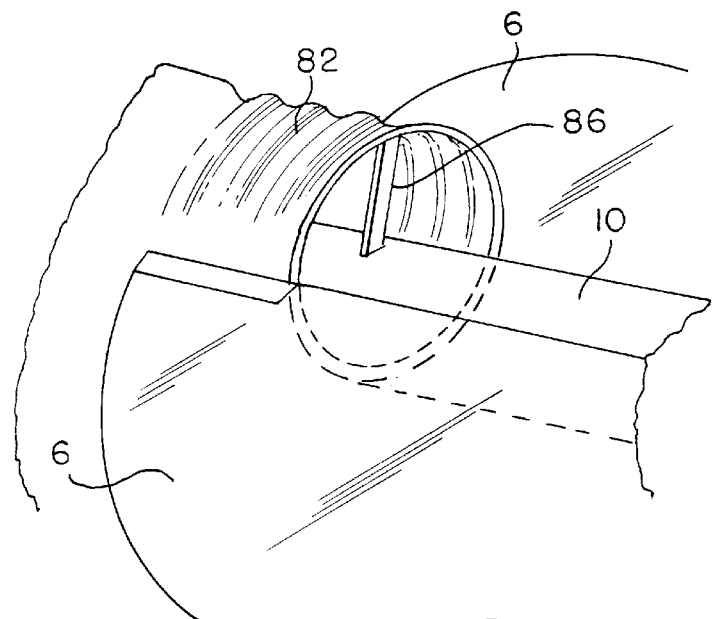

The smoother the fluid surface, the more difficult it is to obtain accurate measurements of surface velocity. Ideally, the fluid contains "targets" or scatterers in the surface thereof which reflect the energy beams to provide the Doppler frequency b1 not all fluids whose flow is to be measured contain such targets. Accordingly, it is another aspect of the invention to provide a mechanism which produces disturbances or scatterers in the fluid surface. These disturbances facilitate the reflection of the first and second energy beams to provide the velocity and level measurements. Disturbances are created by providing a fluted surface 82 on the shroud as shown in FIG. 18 where the flutes extend normal to the fluid flow. A piece of string, rope, or other flexible filament 84 or a pivoting rod 86 can also be provided to create disturbances in the fluid surface without unduly collecting debris as shown in FIGS. 17 and 18.

Figure 19:
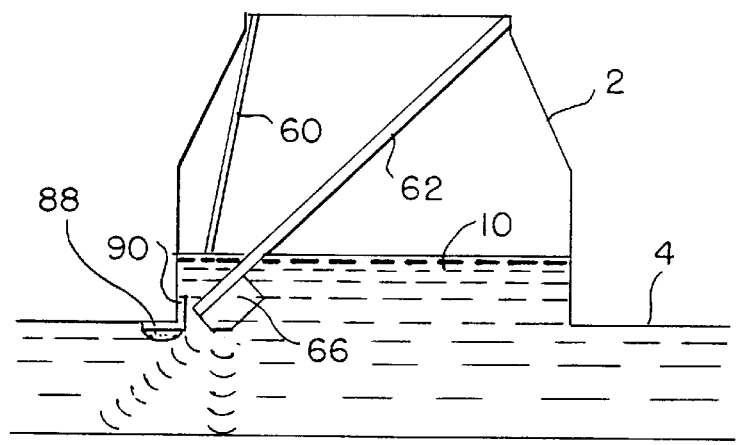
FIG. 19 is a sectional view of an alternate embodiment of the flowmeter of the invention including an auxiliary sensor.

The measurement of fluid velocity under open channel flows that exist at surcharge (full pipe) conditions can alternately be done through an auxiliary flow sensor 88 mounted on an angle bracket as shown in FIG. 19. The auxiliary sensor is preferably of a different energy type than the primary sensor 66. For example, the auxiliary sensor can be of the submerged acoustic Doppler or electromagnetic type for providing the velocity output under full pipe conditions. A pressure transducer 90 can be provided to measure at least the depth of the surcharge above the crown of the pipe when a surcharge condition exists. The transducer is submerged relative to the surcharge into the manhole. The pressure detected by the transducer 90 is a function of the depth of the surcharge. The transducer can be any known type, such as one responsive to pressure from a bubbler or a submerged piezocrystal responsive to static pressure resulting from the weight of the fluid as a function of depth.

Figure 21:
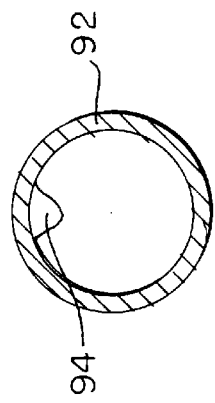
FIGS. 20 and 21 are side and end sectional views, respectively, of a further configuration of the shroud.
Figure 20:
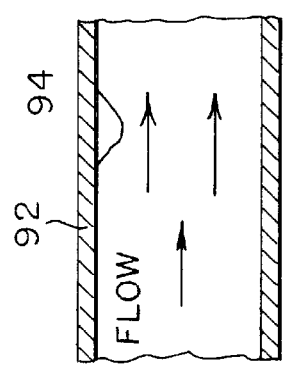

A flowmeter according to the invention can also be used to measure the velocity at the fluid surface and fluid level in a closed pipe or channel where the pipe is made of a material which is transparent to microwave energy. In FIGS. 20 and 21, there is shown a closed pipe 92 having a sensor embedded within an interior projection or indentation 94. A similar indentation can be incorporated in the shroud 78 shown in FIGS. 15–18. The primary advantage of the indentation is that it allows for the measurement of velocities away from the pipe wall when full pipe conditions exist.

Figure 23:
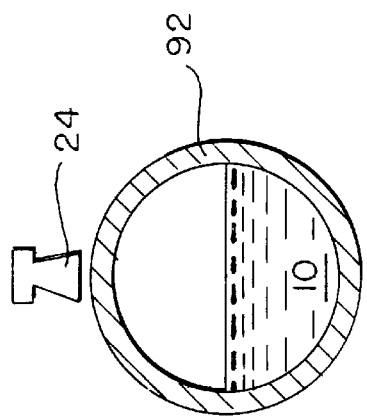
FIGS. 22 and 23 are side and end sectional views, respectively, of a flow sensor according to the invention used to measure flow in a closed pipe formed of a material transparent to the energy beams of the sensor.
Figure 22:
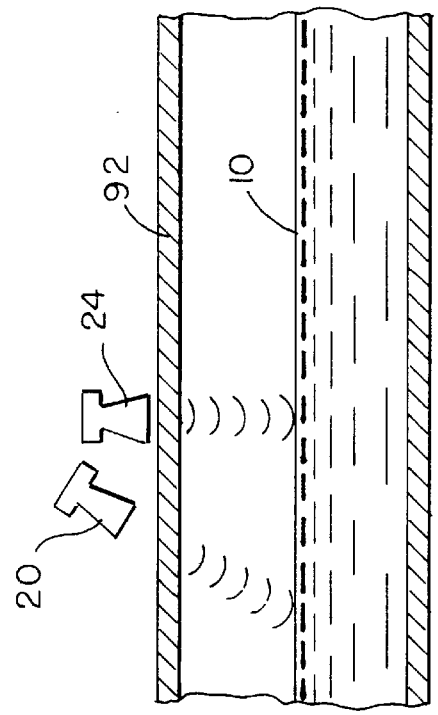
Figure 24:
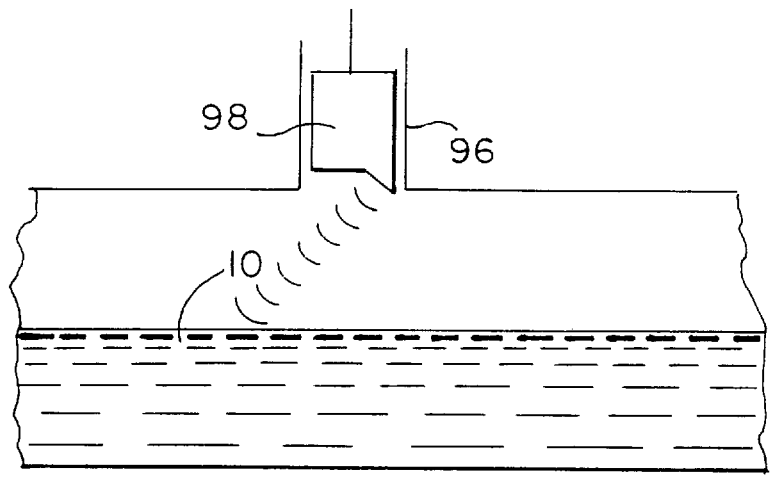
FIG. 24 is a side perspective view of a flow sensor according to the invention mounted in a stand pipe.

In the embodiment of FIGS. 22 and 23, the pipe 92 is formed of a material transparent to microwaves and the velocity 20 and level 24 sensors are arranged exteriorly of the pipe. Finally, in the embodiment of FIG. 24, the closed pipe 92 includes a standpipe 96 within which a combined sensor 98 for measuring surface velocity and level is mounted. The sensor can be, for example, a combination of microwave, acoustic or laser sensors.

With the non-invasive flowmeter according to the invention, the following combinations of energy signals can be used to measure velocity at the fluid surface and fluid level:

| VELOCITY | LEVEL |
|---|---|
| microwave | acoustic |
| microwave | microwave |
| acoustic | microwave |
| acoustic | acoustic |
| laser | laser |

These combinations increase the versatility of the flowmeter in accordance with the preferences of the customer and with the environment in which the fluid flow is to be determined.

While in accordance with the provisions of the Patent Statute the preferred forms and embodiments of the invention have been illustrated and described, it will be apparent to those of ordinary skill in the art that various changes and modifications may be made without deviating from the inventive concepts set forth above.

What is claimed is:

1. A method for measuring the velocity of fluid flowing through a pipe without invading the fluid, comprising the steps of
   (a) generating an energy signal in the form of a first beam from a source above the fluid surface;
   (b) directing said first beam at an acute angle toward a given area of the fluid surface across the pipe;
   (c) detecting a beam reflected from the fluid surface;
   (d) determining from the directed and reflected beams the Doppler frequency shift therebetween to produce a surface velocity signal representative of the velocity of scatterers on the fluid surface; and
   (e) modifying said surface velocity signal with a modifier in accordance with said given area of the fluid surface being detected to produce a mean velocity signal.

2. A method as defined in claim 1, wherein said surface velocity signal is modified in accordance with at least one of the fluid depth, the diameter of the pipe, the configuration of the pipe, the distribution of velocities at the fluid surface between the walls of the pipe, and the ratio of velocity at the fluid surface to fluid level.

3. A method as defined in claim 2, wherein said energy signal comprises one of microwave, acoustic and laser energy.

4. A method as defined in claim 1, and further comprising the step of measuring the level of the fluid within the vicinity of said given area.

5. A method as defined in claim 4, wherein said level measurement is obtained by
   (a) providing a reference signal corresponding with the configuration of the pipe;
   (b) directing a second energy beam from the source toward the fluid surface;
   (c) determining the air space between the source and the fluid surface from a second beam reflected from the surface; and
   (d) relating changes in the air space to changes in the fluid level in accordance with said reference signal.

6. A method as defined in claim 5, wherein said second energy beam comprises one of microwave, acoustic, and laser energy.

7. A method as defined in claim 5, wherein said second beam is directed toward the fluid surface coincident with said first beam.

8. A method as defined in claim 5, wherein said second beam is directed toward the fluid surface generally perpendicular to the surface.

9. A method as defined in claim 5, and further comprising the step of the processing said reflected second energy beam to eliminate portions of the reflected beam from non-moving surfaces, thereby to increase the accuracy of the fluid level measurement.

10. A method as defined in claim 9, wherein said processing step includes eliminating variations in level measurement resulting from ripples and waves within the fluid.

11. A method as defined in claim 10, wherein said processing step further includes analyzing the portion of said variations in level measurement from ripples and waves to determine the frequencies present and eliminating said frequencies from said velocity Doppler signals.

12. A method as defined in claim 9, wherein said processing step further includes the step of analyzing the roughness of said fluid surface and adjusting the modification of said surface velocity signal in accordance with the surface roughness.

13. A method as defined in claim 5, wherein said first and second beams are generated from a location indexed to a crown of the pipe.

14. A method as defined in claim 1, and further comprising the step of creating disturbances in the fluid surface when said pipe is at least partially full.

15. Apparatus for measuring the velocity of a fluid flowing through a pipe without invading the fluid, comprising
   (a) means arranged above the fluid for producing a surface velocity signal representative of the velocity of scatterers on the surface of the fluid at a given location across the pipe; and
   (b) means connected with said surface velocity signal producing means for modifying said surface velocity signal with a modifier in accordance with said given location of the fluid surface being detected to produce a mean velocity signal.

16. Apparatus as defined in claim 15, wherein said surface velocity signal producing means comprises a sensor.

17. Apparatus as defined in claim 16, and further comprising means for mounting said sensor at a location indexed to the crown of the pipe.

18. Apparatus as defined in claim 17, wherein said mounting means is tensioned upwardly against two crowns of the pipe on opposite areas of an opening between a manhole and the pipe.

19. Apparatus as defined in claim 17, wherein said sensor mounting means are arranged at one of an entrance and exit of a pipe with respect to a manhole having a sidewall and an access opening.

20. Apparatus as defined in claim 19, wherein said mounting means comprises a rigid pole for pressing said sensor against the manhole sidewall and means for tensioning said sensor upwardly against the crown of the pipe; whereby said sensor is rigidly mounted in a known location relative to the crown.

21. Apparatus as defined in claim 17, wherein said mounting means further comprises a mounting bracket connected with said manhole adjacent the access opening, said pole and said tensioning means depending from said mounting bracket.

22. Apparatus as defined in claim 20, wherein said mounting means further comprises an angle bracket with which said sensor is connected, said angle bracket being wedged by said pole and said tensioning means against the sidewall of the manhole and the crown of the pipe.

23. Apparatus as defined in claim 22, and further comprising a universal coupling for connecting said sensor with said angle bracket, whereby said sensor is self leveling.

24. Apparatus as defined in claim 20, wherein said tensioning means comprises a cable.

25. Apparatus as defined in claim 20, wherein said pole and said tensioning means each comprise telescoping segments, at least one of said segments comprising a compression-biased strut.

26. Apparatus as defined in claim 16, wherein said modifier is a function of at least one of the fluid depth, the diameter of the pipe, the configuration of the pipe, the distribution of velocities at the fluid surface between the walls of the pipe, and the ratio of velocity at the fluid surface to fluid level.

27. Apparatus as defined in claim 26, wherein said sensor directs a first energy beam toward the fluid surface at an acute angle, detects the beam reflected from the fluid surface, and determines the Doppler frequency shift between said directed and reflected beams to produce said surface velocity signal.

28. Apparatus as defined in claim 27, wherein said first energy beam comprises one of microwave, acoustic, and laser energy.

29. Apparatus as defined in claim 26, wherein said sensor further produces an output signal corresponding with the level of the fluid within the vicinity of said given area, whereby said level and mean velocity signals can be combined to calculate the flow of the fluid.

30. Apparatus as defined in claim 29, wherein said sensor further directs a second energy beam toward the fluid surface, determines the air space between the sensor and the fluid surface from a second energy beam reflected from the surface, and relates changes in the air space to changes in fluid level in accordance with a reference corresponding with the configuration of the pipe.

31. Apparatus as defined in claim 30, wherein said second energy beam comprises one of microwave, acoustic, and laser energy.

32. Apparatus as defined in claim 30, wherein said second energy beam is directed toward the fluid surface generally coincident with said first beam.

33. Apparatus as defined in claim 30, wherein said second energy beam is directed toward the fluid surface generally perpendicular to the surface.

34. Apparatus as defined in claim 30, and further comprising processing means connected with said sensor for processing said reflected second energy beam to eliminate portions of said reflected beams from non-moving surfaces, thereby to increase the accuracy of the fluid level measurement.

35. Apparatus as defined in claim 34, wherein said processing means eliminates variations in level measurement resulting from ripples and waves within the fluid.

36. Apparatus as defined in claim 35, wherein said processing means further analyzes the portion of said variations in level measurement resulting from ripples and waves to determine the frequencies present and eliminates said frequencies from said surface velocity Doppler signals.

37. Apparatus as defined in claim 34, wherein said processing means processes said fluid level signal to analyze the roughness of the fluid surface and adjusts said modifying means in accordance with the surface roughness.

38. Apparatus as defined in claim 16, and further comprising means for creating disturbances in the fluid surface when said pipe is at least partially full.

39. Apparatus as defined in claim 38, wherein said disturbance creating means comprises a shroud extending from said pipe adjacent said sensor, said shroud having an uneven inner surface.

40. Apparatus as defined in claim 38, wherein said disturbance creating means comprises one of a string, a rod, and an air stream.

41. Apparatus as defined in claim 38, wherein said disturbance creating means comprises a second fluid superimposed between the fluid to be measured and an inner surface of the pipe, said second fluid being transparent to microwaves.

42. Apparatus as defined in claim 41, wherein said second fluid comprises one of gas and a low dielectric constant liquid.

43. Apparatus as defined in claim 16, wherein said sensor includes an auxiliary sensor extending beneath said mounting means for sensing the velocity of the fluid when the pipe is full.

44. Apparatus as defined in claim 43, wherein said auxiliary sensor is one of an electromagnetic, acoustic Doppler, microwave Doppler, and differential pressure sensors.

45. Apparatus as defined in claim 30, and further comprising reflector means arranged between said sensor and the fluid for reflecting a second energy beam from said sensor toward the fluid surface generally perpendicular to the surface.

46. Apparatus as defined in claim 29, and further comprising a second sensor for measuring fluid level extending above the crown of the pipe into the manhole under surcharge flow conditions.

47. Apparatus as defined in claim 46, wherein said second sensor comprises a pressure transducer.

* * * * *

UNITED STATES PATENT AND TRADEMARK OFFICE
CERTIFICATE OF CORRECTION

PATENT NO. : 5,811,688
DATED : September 22, 1998
INVENTOR(S) : Lawrence B. Marsh et al.

It is certified that error appears in the above-identified patent and that said Letters Patent is hereby corrected as shown below:

<u>Title page,</u>
ABSTRACT,
Lines 8 and 9, change "sensors surface" to -- sensors. A surface --

<u>Column 2,</u>
Line 47, change "first" to -- surface velocity --
Lines 49 and 66, after "surface" insert -- velocity --

<u>Column 4,</u>
Line 60, change "$SV_1$" to -- $S_{V1}$ --

Signed and Sealed this

Thirtieth Day of July, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 5,811,688
DATED : September 22, 1998
INVENTOR(S) : Lawrence B. Marsh et al.

It is certified that error appears in the above-identified patent and that said Letters Patent is hereby corrected as shown below:

Column 6,
Line 4, change "surfface" to -- surface --
Line 21, change "c3 c4" to :
-- in order to produce a velocity multiplier signal $V_M$ that is used to select a flow coefficient from the flow multiplier 44 that is in turn used to modify the sensed local surface velocity signal $S_V$ to approximate the mean velocity. Different --

Column 8,
Line 38, change "b1" to :
-- shift differentials necessary for accurate surface velocity meansurement. However, --

Signed and Sealed this

Seventeenth Day of September, 2002

Attest:

JAMES E. ROGAN
Attesting Officer        Director of the United States Patent and Trademark Office